April 22, 1930.  F. R. WALLACE  1,755,679
MOLDING MACHINE
Filed Jan. 17, 1928  2 Sheets-Sheet 1
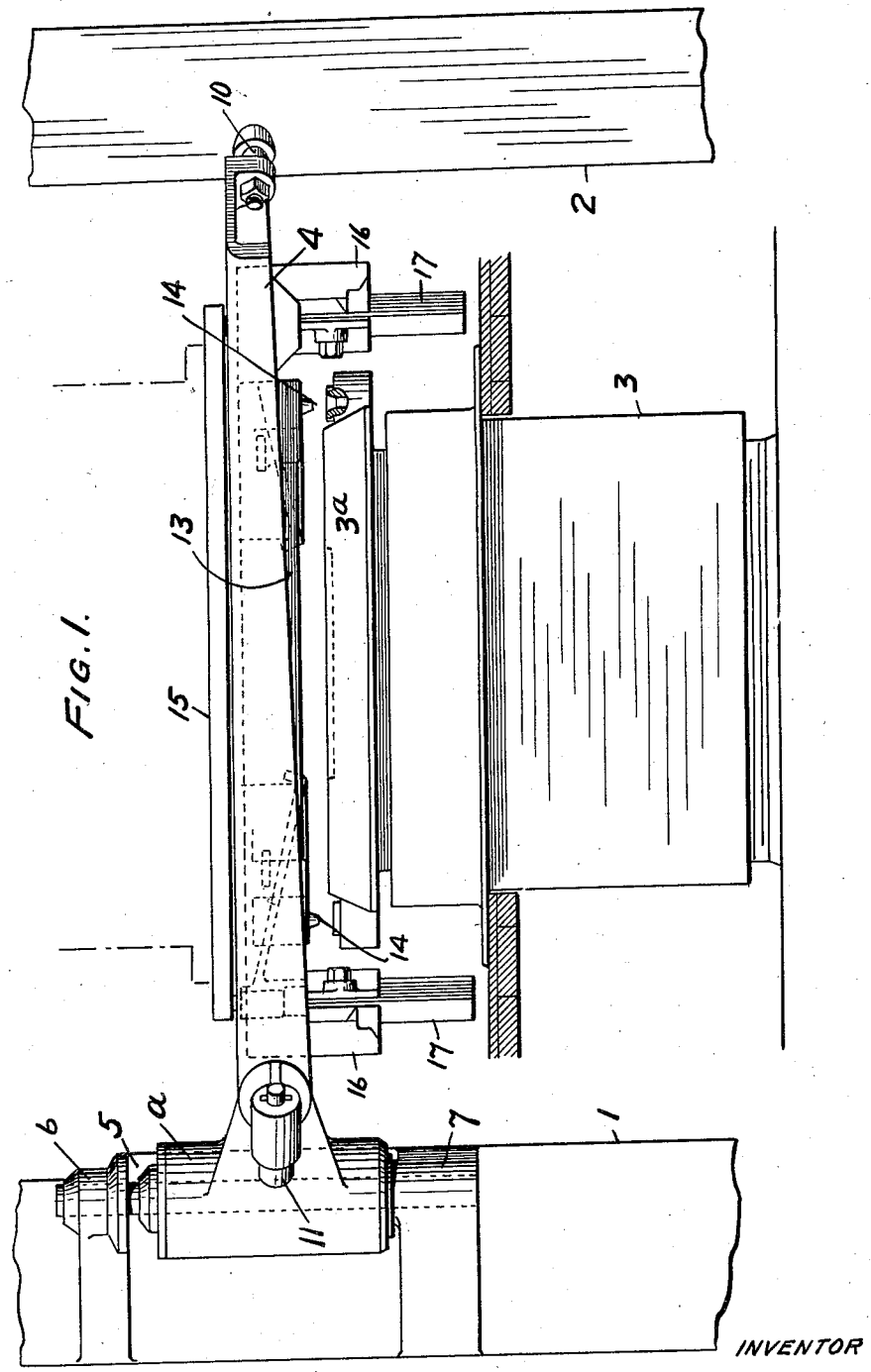
INVENTOR
Frank R. Wallace
BY
Augustus B. Stoughton
ATTORNEY.
WITNESS:
Robt R Kitchel

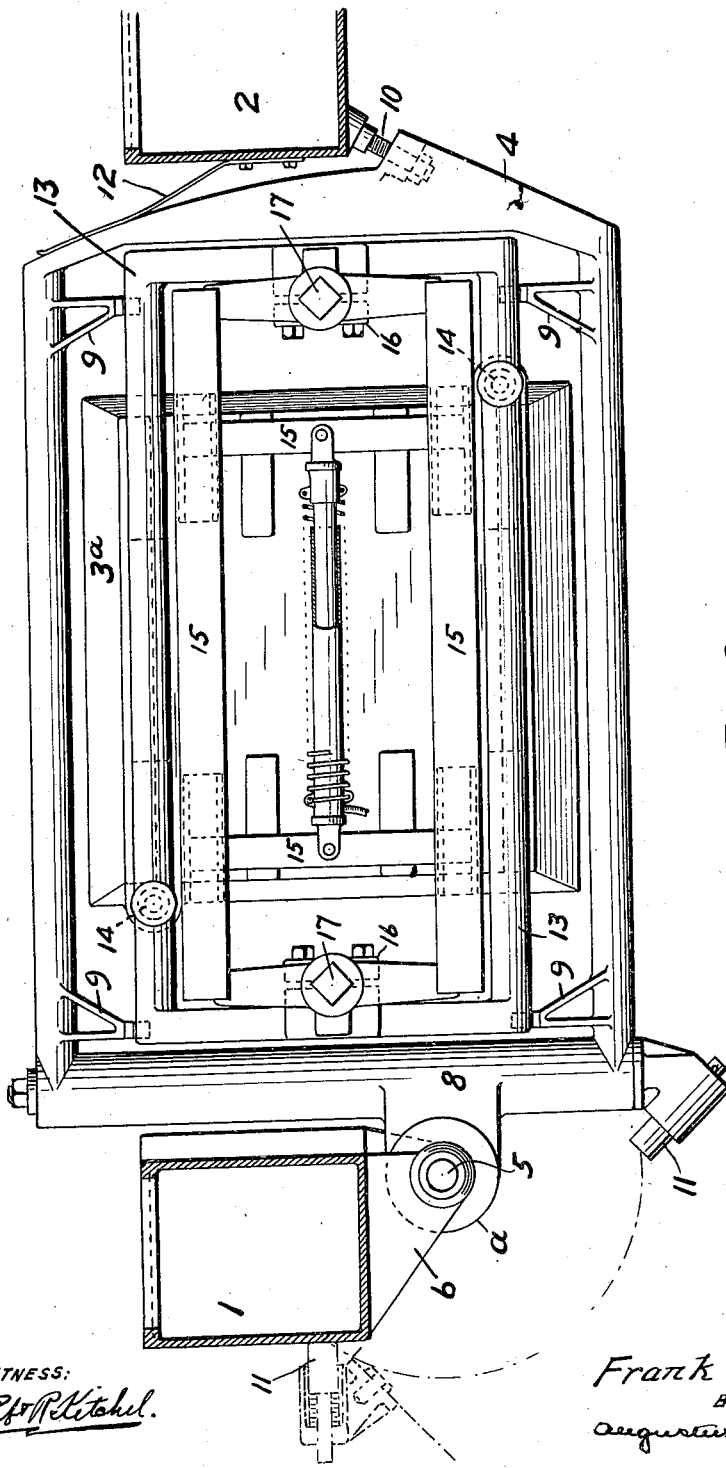

Patented Apr. 22, 1930

1,755,679

UNITED STATES PATENT OFFICE

FRANK R. WALLACE, OF PHILADELPHIA, PENNSYLVANIA, ASSIGNOR TO THE TABOR MANUFACTURING COMPANY, OF PHILADELPHIA, PENNSYLVANIA, A CORPORATION OF PENNSYLVANIA

MOLDING MACHINE

Application filed January 17, 1928. Serial No. 247,271.

The present invention relates more particularly to a swing frame for molding machines which is used for delivering a mold part with a mold cavity or part of a mold cavity therein from the machine.

Objects of the invention are to improve and simplify the construction and mode of operation of the machine.

Other objects will appear from the following description at the end of which the invention will be claimed.

The description will be given in connection with the embodiment of the invention chosen for illustration in the accompanying drawings forming part hereof and in which—

Figure 1 is an elevational view with parts in section of a swing frame embodying features of the invention with which it cooperates, and Fig. 2 is a top or plan view of the same with parts in section.

In the drawings 1 and 2 indicate upright parts or standards of a frame or support of a molding machine and 3 indicates the ramming or jar ramming provisions of the same. These provisions include a table 3ª movable vertically. 4 is a swing frame. 5 indicates hinge means between the standard 1 and frame, and these means are constructed and arranged to permit turning and prevent sliding movement of the frame 4 in respect to the standard 1. As shown these means comprise upper and lower arms 6 and 7 between which is arranged the hinge pintle member $a$, and the frame 4, or more accurately, the lug 8 formed on it is connected with the pintle member. The lug 8 is disposed to one side of the center line of the frame 4 so that the frame may be swung into proper position between the standards 1 and 2. The hinge frame 4 is provided with brackets 9 for a purpose to be presently described and with adjustable stops 10 and 11 of which the stop 10 serves in connection with the spring 12 to position the frame as shown in Fig. 2, and of which the stop 11 serves, as indicated by dotted lines in Fig. 2, in cooperation with the standard 1 to limit the swing of the frame out of the machine. There is a second frame 13 and it is arranged within the hollow portion of the swing frame 4 so as to be supported thereby with freedom for upward and downward movement in respect thereto when actuated by the jarring or ramming provisions 3. As shown the second frame 13 is seated on the brackets 9, and when acted upon by the mechanism 3 is kept in alignment therewith by the dowel pins 14, Fig. 1. The second frame 13 carries a leveling device 15, too well understood to require detail description, and adapted to receive and support a mold part. The connection between the leveling device 15 and the second frame is an adjustable one and it is shown to consist of the clamping jaws 16 and the posts 17, so that the leveling device may be adjusted toward and away from the second frame 13 to accommodate flask parts of different depths.

The mode of operation of the described device may be explained as follows:

With the parts in the positions shown several things may be accomplished. A flask having a mold cavity therein and deposited upon the leveling device may be brought to a position for convenient removal by swinging the frame 4 into the position indicated by dotted lines in Fig. 2. A flask support upon the leveling device may be rammed by causing the table 3ª to rise and engage the frame 13 and lift it clear of the frame 4, and then upon completion of ramming and pattern drawing, the second frame 13 can be redeposited upon the frame 4 and the latter swung into the position shown in dotted lines in Fig. 2 for the removal of the flask.

The leveling device is not in all cases necessary and optionally may be omitted or provided.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. In a molding machine a standard, a swinging hollow frame, hinge means between the standard and frame constructed and arranged to permit horizontal turning and oppose vertical sliding movement, and a second frame seated on the swinging frame and disconnected therewith for freedom of upward motion.

2. In a molding machine a standard, a swinging hollow frame, hinge means between the standard and frame constructed and arranged to permit turning and oppose sliding movement, a second frame seated on the swinging frame and disconnected therewith for freedom of upward motion, and a leveling device carried by the second frame.

3. In a molding machine a standard, a swinging hollow frame, hinge means between the standard and frame constructed and arranged to permit turning and oppose sliding movement, a second frame seated on the swinging frame and disconnected therewith for freedom of upward motion, a leveling device, and adjustable clamping means between the leveling device and the second frame.

4. A molding machine having a vertically movable table, a hollow frame through which said table may rise and fall and which is mounted for horizontal swinging movement over the table and to one side thereof, and a second frame seated on the swinging frame and liftable by the table.

5. A molding machine having a vertically movable table and a pair of standards, a hollow frame through which said table may rise and fall and which is mounted for swinging movement over the table and to one side thereof, a second frame seated on the swinging frame and liftable by the table, and stop mechanism interposed between the first mentioned frame and the standards.

FRANK R. WALLACE.